United States Patent
Whitehead et al.

(10) Patent No.: US 9,304,287 B2
(45) Date of Patent: Apr. 5, 2016

(54) LIGHT CONCENTRATING APPARATUS

(71) Applicant: SunCentral Inc., Richmond (CA)

(72) Inventors: Lorne A. Whitehead, Vancouver (CA);
Allen James Upward, Vancouver (CA);
Peter George Friedel, Burnaby (CA)

(73) Assignee: SUNCENTRAL, INC. (CA)

(*) Notice: Subject to any disclaimer, the term of this patent is extended or adjusted under 35 U.S.C. 154(b) by 0 days.

(21) Appl. No.: 14/106,367

(22) Filed: Dec. 13, 2013

(65) Prior Publication Data

US 2014/0168802 A1    Jun. 19, 2014

Related U.S. Application Data

(60) Provisional application No. 61/831,667, filed on Jun. 6, 2013, provisional application No. 61/738,543, filed on Dec. 18, 2012.

(51) Int. Cl.
*G02B 7/183* (2006.01)
*G02B 5/10* (2006.01)
*G02B 17/00* (2006.01)
*G02B 19/00* (2006.01)

(52) U.S. Cl.
CPC  *G02B 7/183* (2013.01); *G02B 5/10* (2013.01); *G02B 17/002* (2013.01); *G02B 17/004* (2013.01); *G02B 17/006* (2013.01); *G02B 19/00* (2013.01)

(58) Field of Classification Search
CPC .. G02B 17/002; G02B 17/004; G02B 17/006; G02B 19/00
USPC .......... 359/727, 730, 731, 856–859, 861–863
See application file for complete search history.

(56) References Cited

U.S. PATENT DOCUMENTS

| | | | |
|---|---|---|---|
| 4,031,384 A | | 6/1977 | Sherman, Jr. |
| 4,131,485 A | * | 12/1978 | Meinel et al. ................ 359/853 |
| 4,389,085 A | | 6/1983 | Mori |
| 4,723,535 A | * | 2/1988 | Lew .............................. 359/726 |
| 5,540,216 A | | 7/1996 | Rasmusson |
| 6,540,382 B1 | | 4/2003 | Simon |
| 7,492,454 B2 | * | 2/2009 | Hubinois et al. ............. 359/858 |
| 7,639,423 B2 | | 12/2009 | Kinney et al. |
| 7,982,956 B2 | | 7/2011 | Kinney et al. |
| 8,223,433 B2 | | 7/2012 | Schmaelzle et al. |
| 8,513,515 B1 | | 8/2013 | Gu |
| 2007/0035841 A1 | | 2/2007 | Kinney et al. |

(Continued)

FOREIGN PATENT DOCUMENTS

| | | |
|---|---|---|
| EP | 1493124 | 7/2006 |
| EP | 2068070 | 6/2009 |

(Continued)

*Primary Examiner* — Scott J Sugarman
*Assistant Examiner* — Alberto Betancourt
(74) *Attorney, Agent, or Firm* — Fish & Tsang, LLP (57) ABSTRACT

A light concentrating apparatus is presented. Disclosed apparatuses include a collection of shaped reflectors capable of redirecting incident light, sunlight for example. The reflectors are configured to modify the spatial distribution of the redirected light in a manner where the distribution of light associated with a first dimension is modified differently than the distribution of light associated with a second, different dimension, via a relay of reflections. Contemplated apparatuses generate a substantially collimated output beam subsequent to the relay of reflections.

13 Claims, 8 Drawing Sheets

(56) References Cited

U.S. PATENT DOCUMENTS

| 2009/0147523 | A1 | 6/2009 | Levon |
| 2010/0067114 | A1 | 3/2010 | Kinney et al. |
| 2010/0084017 | A1 | 4/2010 | Walden, Sr. |
| 2011/0272002 | A1 | 11/2011 | Liu |
| 2012/0037205 | A1 | 2/2012 | Tadayon et al. |

FOREIGN PATENT DOCUMENTS

| WO | 98/55798 | 12/1998 |
| WO | 03/077192 | 9/2003 |
| WO | 2006/033090 | 3/2006 |
| WO | 2012/021471 | 2/2012 |

\* cited by examiner

LIGHT CONCENTRATING APPARATUS

This application claims the benefit of priority to U.S. Provisional Application Nos. 61/831,667, filed on Jun. 6, 2013, and 61/738,543, filed on Dec. 18, 2012. These and all other extrinsic materials referenced in this document are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is light redirection and concentration technologies.

BACKGROUND

The following description includes information that may be useful in understanding the present invention. It is not an admission that any of the information provided herein is prior art or relevant to the presently claimed invention, or that any publication specifically or implicitly referenced is prior art.

Various efforts have been placed towards distribution or concentration of sunlight for specific uses. Examples include U.S. Pat. No. 8,513,515 to Gu and U.S. Pat. No. 8,223,433 to Schmaelzle. Known light collecting or collimating apparatuses typically require numerous optical elements to redirect light to an acceptable output beam, and treat each dimension (e.g., X, Y, etc.) of an incident beam on an equal footing. Thus, incident light is redirected or collimated in one dimension in the same manner as any other dimension.

While such an approach could be efficient with respect to light travelling in a first direction, it could be inefficient with respect to light travelling in a second direction. This is especially true in environments having a restricted physical space where the apparatuses are to be deployed. Therefore, existing systems use optical elements having a geometry that results in inefficient uses of at least one of incident light and space.

Thus, there is still a need for improved light concentrating technologies, especially those that could efficiently concentrate dimensions of a light beam differently from one another.

SUMMARY OF THE INVENTION

The inventive subject matter provides apparatus, systems and methods in which a light collecting element and an optical assembly are used to redirect and concentrate incident or redirected light having unequal dimensions into an output beam. As used herein, an incident or redirected light having unequal dimensions refers to (1) a beam having a rectangular cross section with a length (a) and a width (b), wherein a≠b; (2) a beam having an elliptical cross section with a first radius (r1) and a second radius (r2), wherein r1≠r2; or (3) a beam having any other suitable cross section having a first distance (d1) from a mid-point, and a second distance (d2) from the midpoint, wherein d1≠d2.

Applicant surprisingly discovered that different dimensions of incident light could be treated separately within a single light concentrating apparatus to give rise to spatial efficiency. As described further below, collimating incident light differently for each spatial dimension allows an apparatus to be constructed that fits within a limited space, such as a wall envelope or a window frame.

In some aspects of the inventive subject matter, a light concentrating apparatus includes one or more light collecting elements that are configured to receive incident (e.g., sunlight, etc.) or other light, and redirect it to a non-imaging optical assembly. The optical assembly can be configured to receive the redirected light and serially modify at least one of a directional and spatial distribution (or distributions) of the redirected light through a relay of reflections, via a plurality of optical elements, to form an output beam.

One should appreciate that the optical elements could be sized and dimensioned to concentrate dimensions of a light beam differently from one another. For example, a first optical element could have a technical effect of providing a narrowed beam such that a narrowing in a first dimension (e.g., x dimension) is not the same as a narrowing in a second dimension (e.g., y dimension). A second optical element could have a technical effect of further narrowing the beam such that a narrowing in the first dimension is not the same as a narrowing in the second dimension. Viewed from another perspective, the first optical element could receive a beam having a 5'×10' rectangular cross section, and concentrate the beam such that a resulting beam has a 3'×9' rectangular cross section. The second optical element could receive the resulting beam and further concentrate it such that the second resulting beam has a 2'×5' rectangular cross section. Thus, a combination of the first and second optical elements could have a technical effect of concentrating an incident or redirected light beam having a first set of dimensions into a product light beam having a second set of dimensions, wherein the first and second sets of dimensions have different ratios. Alternatively or additionally, the combination of the first and second optical elements could have a technical effect of concentrating a light beam having a first set of dimensions into a product light beam having a second set of dimensions, wherein the first and second sets of dimensions have the same ratio, but wherein the first and second optical elements narrow different dimensions of the beam differently. Viewed from another perspective, an apparatus of the inventive subject matter could receive sunlight having cross-sectional dimensions $a_1$ and $b_1$ wherein $a_1 \neq b_1$; redirect a concentrated version of the received sunlight, wherein the concentrated version of the received sunlight has cross-sectional dimensions $a_r$ and $b_r$, wherein $a_r \neq b_r$; and produce an output beam having cross-sectional dimensions $a_o$ and $b_o$, wherein $a_o \neq b_o$.

A light collecting element of the inventive subject matter could comprise any suitable element, including for example, an incident light reflector (e.g., a non-planar mirror, etc.) or a lens (e.g., a Fresnel lens, etc.). Additionally or alternatively, the light collecting element could comprise one, two, three, four, or even five or more optical powers associated with one or more dimensions of incident or other light.

The non-imaging optical assembly preferably comprises a plurality of non-planar (shaped) reflectors (e.g., semi-transparent or other mirrors, glass, metal, etc.) that are sized and dimensioned to serially modify the directional and spatial distribution of light. Viewed from another perspective, the reflectors could modify distribution(s) of light redirected via the light collecting element through a relay of reflections that could form one or more loops, triangular shapes, rectangular shapes, or any other suitable shapes.

One, two, some or all of the shaped reflectors could comprise surfaces that are defined substantially according to the formula: $z = A + Bx + Cx^2 + Dy^2 + Exy^2 + Fx^3$, wherein coefficients A, B, C, D, E and F are different for each of the one, two, some or all of the shaped reflectors, where x represents a position measured substantially horizontally perpendicular to the building façade, z represents a position measured in a vertical direction, and coefficients A, B, C, D, E, and F are obtained by a deterministic numerical optimization technique to maximize a transmission of visible light into at least one of a predetermined spatial aperture and a predetermined angular range. Additionally or alternatively, some or all of the shaped reflectors could be formed from a plurality of side-by-side strips having a width to length ratio of less than 1:5 and formed from surfaces having a simple curvature that approximate surfaces of complex curvature associated with the aforementioned formula with sufficient accuracy so as not to reduce a fraction of transmission into at least one of a predetermined spatial aperture and a predetermined angular range by more than 20%. Additionally or alternatively, some or all of the shaped reflectors could have a shape that deviates from a shape associated with the aforementioned formula, and such deviation could be sufficiently small so as not to reduce a fraction of transmission into at least one of the predetermined spatial aperture and the predetermined angular range by more than 20%.

In some embodiments, the optical assembly could comprise one or more optical powers associated with different dimensions of incident or redirected light. These dimensions could be parallel to one another, substantially parallel to one another, orthogonal to one another, substantially orthogonal to one another, or have any other suitable arrangement (e.g., 0-90 degrees relative to one another, 0-45 degrees relative to one another, 0-20 degrees relative to one another, 0-10 degrees relative to one another, etc.).

Additionally or alternatively, the optical assembly and could comprise (1) a parallel extent (T) that is substantially parallel to an output beam, and (2) an orthogonal extent (Z) that is substantially orthogonal to the output beam and approximately parallel a long dimension of the relay of reflections that serially modify distribution(s) of light redirected by the light concentrating apparatus.

As used herein, the term "substantially" means within 25%. As used herein, the term "approximately" means within 15%. Thus, a parallel extent that is substantially parallel to an output beam is a parallel extent that extends within 11.25 degrees of the output beam. An orthogonal extent that is approximately parallel a long dimension of the relay of reflections is an orthogonal extent that extends within 6.75 degrees of the long dimension.

The non-imaging optical assembly could additionally or alternatively comprise an aspect ratio of less than 0.66, less than 0.56, less than 0.46, less than 0.36, less than 0.26 or even less than 0.16, wherein the aspect ratio is defined by the parallel extent divided by the orthogonal extent (T/Z). Preferably the projected profile of the relay of reflections falls within the aspect ratio of the optical assembly. Viewed from another perspective, it is contemplated that the parallel extent could be less than or equal to 50%, less than or equal to 40%, less than or equal to 30%, less than or equal to 20%, or even less than or equal to 10% of the orthogonal extent. It should also be appreciated that the optical assembly could be contained in a housing such as an interior cavity of a building wall, a building envelope, an interior cavity of a window frame, or any other suitable housing.

As used herein, a "non-imaging optical assembly" refers to an assembly comprising optics that provide wider acceptance angles and higher solar concentrations. Viewed from another perspective, a non-imaging optical assembly is concerned with the optimal transfer of light radiation between a source and a target. The techniques involved in a non-imaging optical assembly do not attempt to form an image of the source, but instead desires an optimized optical system for optical radiative transfer from a source to a target.

In some aspects of the inventive subject matter, the output beam formed by the non-imaging optical assembly could comprise an unfocused beam, a focused beam, or a substantially or completely collimated beam. The output beam could have a cross sectional area that is less than or equal to 75% (e.g., 25-75%, 51-75%, 60-75%, 65-75%, etc.), less than or equal to 50% (e.g., 10-50%, 15-50%, 25-50%, 35-50%, etc.), less than or equal to 35% (5-35%, 10-35%, 25-35%, etc.), less than or equal to 25% (e.g., 5-25%, 10-25%, 15-25%, 20-25%, etc.), or even less than or equal to 15% (e.g., 5-15%, 10-15%, etc.) of a cross sectional area of the redirected light from the light collecting element. Viewed from another perspective, the output beam could comprise an output aspect ratio that is different from an input aspect ratio of at least one of the incident light and the redirected light. Viewed from yet another perspective, the output beam could be concentrated by at least a factor of 5 (e.g., a factor of between 5-10, etc.), at least a factor of 10 (e.g., a factor of between 10-15, etc.), at least a factor of 15 (e.g., a factor of between 15-20, etc.), at least a factor of 20 (e.g., a factor of between 20-25, etc.), at least a factor of 25 (e.g., a factor of between 25-30, etc.), or even a factor of 30 or more (e.g., a factor of between 30-50, etc.) with respect to the incident light. In some embodiments, the output beam is concentrated by no more than a factor of thirty with respect to the incident light. Additionally or alternatively, an output etendue of the output beam could be less than or equal to 20 times, less than or equal to 15 times, less than or equal to 10 times, or even less than or equal to 5 times an input etendue of the incident or redirected light.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

In yet further aspects of the inventive subject matter, the output beam could be received by a light guide optically coupled with the non-imaging optical assembly. It should also be appreciated that the spatial distribution of the redirected light associated with a first dimension could be modified differently that the spatial distribution associated with a second, different dimension.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

A light concentrating apparatus of the inventive subject matter includes a light collecting element and an optical assembly, each comprising one or more optical elements, and is configured to redirect and concentrate sunlight into a collimated beam for optimal distribution. In most embodiments, the apparatus is configured to accept sunlight traveling at +/−20 degrees from the vertical direction, concentrate it, and send it substantially horizontally into a building. An apparatus of the inventive subject matter allows for a light concentration path that is confined within a narrow elongated zone, typically achieved by "folding" the path into segments via reflective optics that also concentrate light at least along one dimension. In some embodiments, the cross section of a concentrated beam in one direction could be much larger than a cross section in a perpendicular direction.

It should be appreciated that at least one of the optical assembly and the light collecting element could be disposed within a wall envelope, between double window panes, or any other suitable housing. For example, it is contemplated that a wall envelope could include an exterior, an interior wall and an upper wall extending between the exterior and interior walls, and the upper wall could comprise a glass or other transparent or semi-transparent material that allows sunlight to travel to a light collecting element disposed within the wall envelope or other housing. Viewed from another perspective, a wall envelope or other elongated structure could act as blinders optically coupled to the light collecting element, and provide a columnar light thereto. The light collecting element could then redirect the collected sunlight to an optical assembly comprising a plurality of optical elements. The optical assembly could in some embodiments be disposed within a sub-housing of the housing. In some alternative embodiments, a light collecting element could be disposed exterior to a wall envelope of other optical assembly housing, for example, on a roof, on a ground, on exterior or interior portions of a wall (e.g., where a building comprises an atrium or a skylight, etc.), or any other suitable locations. While not limiting to the scope of the inventive subject matter, one should appreciate that a light collecting element could be located at or within 250 inches, at or within 120 inches, at or within 100 inches, at or within 80 inches, at or within 25 inches, at or within 10 inches, or even at or within 4 inches from at least a portion of the optical assembly (e.g., an optical assembly bounding box, housing, etc.). One should also appreciate that a distance between one or more light collecting elements and one or more optical assemblies could vary greatly depending on various factors, including for example, a size or shape of a building, a size or shape of a bounding box, a size or shape of a skylight, a size or shape of an atrium, or the desired characteristics of an output beam.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The optical assembly housing or sub-housing could comprise any suitable material (e.g., glass, plastic, metal, concrete, etc.) as long as there is at least one portion that allows for the feeding of light (e.g., a window, aperture, etc.).

The distance travelled by an average light ray, after interception by one or more light collecting elements, and before existing an optical assembly as an output beam, can be at least 2 times, at least 3 times, at least 5 times, at least 10 times, at least 20 times, or even at least 25 times or more than an extent of the optical assembly as measured in a direction parallel to an average light ray in the output beam (e.g., a horizontal or substantially horizontal extent, etc.).

The path of light (also referred to herein as a "light path" or "path") typically is at least partially folded upon itself using at least one of the light collecting element and optical assembly, and could comprise light being redirected at various angles. For example, a light ray could travel in a first direction contact a first mirror and bounce towards a second mirror in a second direction that is substantially parallel to, and in the opposite direction of, the first direction. It is also contemplated that a light ray could travel in a first direction and a second direction that are not substantially parallel (i.e., where an angle between the first direction and the second direction is greater than 11.25, greater than 15 degrees, greater than 20 degrees, greater than 25 degrees, or even greater than 45 degrees).

The light path could involve one or more vertical or substantially vertical passes, via reflection from a plurality of shaped reflectors (e.g., mirrors, etc.) as light passes through an enclosure of the non-imaging optical assembly. As one example, this path could involve two, three, four, five, ten, or more vertical (or substantially vertical) passes. The light rays can be intercepted near the top of an optical assembly enclosure, pass to the bottom of the enclosure where it is reflected by a mirror and returned to the top of the enclosure where it is reflected by another mirror back to a bottom portion at or near the first bottom portion. While traveling along this path, the light rays could be gradually concentrated as they pass from one shaped (non-planar, possibly curved) reflector to another. As discussed below the shaped reflectors can include, among other things, convex or concaved mirrors.

One or more of the light collecting optical element and the optical elements in the non-imaging optical assembly could have an optical power (a degree to which the element(s) converges or diverges light) defined in (1) a first direction substantially perpendicular to the optical relay direction, and (2) a second direction perpendicular to both the optical relay direction and the first perpendicular direction. For visualization purposes, in a three-dimensional space comprising x, y, and z planes, where an optical relay is at direction (z), the first direction could be at or substantially at direction (y), and the second direction could be at or substantially at direction (x).

Additionally or alternatively, one or more of the optical elements could comprise an optical power in a first direction that is substantially different from, or of optical sign to, the optical power in the second direction. Examples include compound curvature of a mirror or lens with curvature along an x axis different from a curvature along a y axis.

It is also contemplated that one or more of the optical elements of an apparatus could comprise any reasonable combination of lenses, Fresnel lenses, biconvex lenses, plano-convex lenses, meniscus lenses, plano-concave lenses, biconcave lenses, curved mirrors, Fresnel mirrors, plane mirrors, spherical mirrors, diffractive optical elements, dispersive prisms, reflective prisms, polarizing prisms, deflecting prisms, or any other commercially suitable elements. Exemplary combinations could include, among other things, a combination of at least one Fresnel lens and two or more convex or concave lenses (e.g., two convex and one concave lens, etc.). These sub-elements could have the same or different optical powers or signs in first and second perpendicular directions.

Figure 1:
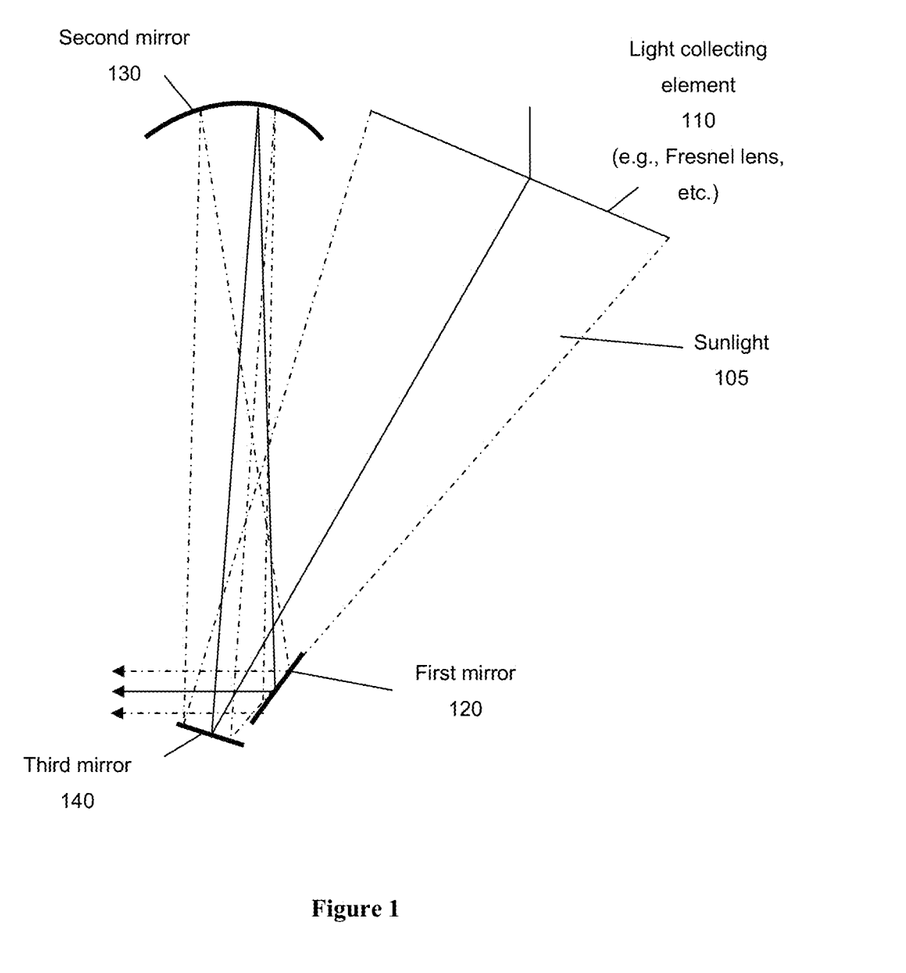
FIG. 1 illustrates aspects of a light concentrating apparatus of the inventive subject matter.

One should appreciate that the disclosed approach is based on the recognition that there can be different concentration "algorithms" in two cross-sectional directions (e.g., (1) a direction perpendicular to the building façade and parallel to the floors of the building, and (2) a direction parallel to the building façade and parallel to the floors of the building). Consider one example using three vertical passes caused by concentration through a Fresnel lens and subsequent reflection from three mirrors via relay of reflections forming a loop, as shown in FIG. 1. Although specific dimensions and configurations are presented with respect to FIG. 1, one should appreciate that all practical, market relevant dimensions are contemplated.

FIG. 1 illustrates some aspects of a light concentrating apparatus of the inventive subject matter. Light collecting element 110 could be configured to receive sunlight 105 traveling at +/−45 degrees, +/−30 degrees, +/−20 degrees, +/−15 degrees, +/−10 degrees, or even +/−5 degrees of the vertical direction (relative to the ground), and modify at least one of a directional and spatial distribution of the received sunlight. As shown, the direction and spatial distribution of the sunlight could be modified (e.g., via refraction and concentration, etc.).

As illustrated, a received beam is nearly vertical (e.g., +/−10 degrees of vertical, etc.), and comprises a cross sectional area of exactly or approximately 18 (perpendicular to the building and parallel to the floor) inches by 60 inches (parallel to the building and parallel to the floor). This nearly vertical beam is then modified into a horizontal or nearly horizontal (e.g., +/−10 degrees of horizontal, etc.) beam having a cross sectional area of exactly or approximately 3 inches by 12 inches, resulting in a concentration of the beam by a factor of 25. This concentrated light could then enter a building or a light guiding structure. It should be appreciated that a cross sectional area of a beam could be circular, oval, square, rectangular, or comprise any suitable shape.

Consider first the concentration in the direction parallel to the building façade wherein the light path between entering and exiting the optical assembly is approximately 9-12 feet, and wherein the width of a horizontal collection area is 5 feet as illustrated and described above, and the length of the collection area is 18 inches as described above. The maximum angle of deflection required to achieve the concentration in the direction parallel to the building façade is approximately in the range of $\tan^{-1}(2.5/9)$ to $\tan^{-1}(2.5/12)$. This angle of deflection is achievable with both high accuracy and high efficiency using readily manufacturable Fresnel lenses.

Consider next the concentration in the direction perpendicular to the building. The light could strike a first mirror 120 at the bottom of an enclosure. Preferably the first mirror is not too wide, which means effectively that the light has to focus in a single pass to the width of this first mirror. This sets a defined range of possible focal lengths associated with the concentration of light in the direction perpendicular to the building, and could constrain other elements of the system. For example, the first mirror 120 could be non-planar as this would result in divergence of the reflected light, and the divergent light would not be contained within the optical assembly structure or enclosure. To avoid such a result, the first mirror 120 could comprise an appropriate cylindrical curvature wherein an axis of symmetry of the mirror 120 is parallel or substantially parallel to the building façade.

The first mirror 120 could advantageously recollimate the redirected light (redirected from one or more light concentrating elements 110) such that all or substantially all of the reflected light strikes second mirror 130 at a top portion of the optical assembly structure or enclosure. Second mirror 130 could advantageously have some or all of the same features as the first mirror 120 (e.g., cylindrically curved to recollimate light and ensure every light ray strikes a third mirror 140). The third mirror 140 could be a cylindrically concave mirror with a center of curvature approximately midway between the center of curvature of the first and second mirrors. Preferably the third mirror 140 receives all (or substantially all) light from the second mirror and deflects it horizontally (or substantially horizontally) into a light guide within a building. Additionally or alternatively, the third mirror 140 could recollimate the light. In some embodiments the third mirror 140 could include a 35-55 degree (preferably 45 degree) reflector with sufficient curvature to cause the desired recollimation.

With further reference to the expel of FIG. 1 above, it should be appreciated that concentration along the 60 inch dimension would theoretically require a greater focal length than concentration along the 18 inch dimension. While some smaller dimensions could be concentrated within a wall envelope via conventional means, some longer dimensions could not. A folding pathway allows concentration of the longer dimensions within the wall envelope or similar housing structure. Viewed from another perspective, a longer pathway is required to deal with concentrating the 60 inches dimension of the beam entering the optical assembly. The 18 inches dimension does not require such a long pathway, and thus could be concentrated using shorter focal length lenses. In some embodiments, the optical assembly comprises a first diverging lens or mirror, a second re-converging lens or mirror, and a third diverging lens or mirror. As such, the 18 inches dimension could be confined in a depth of a wall envelope or other narrow housing. The 60 inches dimension does not need to be confined in this manner as a length of a wall envelope or other housing is not as restricted.

The convenient geometry of the optical assembly allows it to be entirely disposed anywhere within a narrow and elongated space (e.g., within double window panes, joists, vehicles, trailers, etc.). It should be appreciated that an apparatus of the inventive subject matter could comprise any suitable number of light collecting elements (e.g., 1, 2, 3, 4, 5, etc.) and optical assemblies (e.g., 1, 2, 3, 4, 5, 10, 15, 20, etc.). It should also be appreciated that an optical assembly could comprise any suitable number of optical elements (e.g., 2, 3, 4, 5, 10, etc.).

Figure 2:
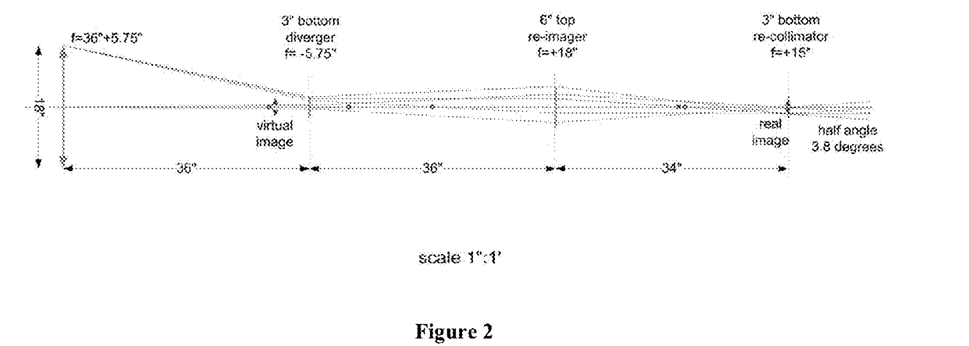
FIG. 2 illustrates an optical configuration of the apparatus of FIG. 1.

FIG. 2 illustrates an optical configuration of the apparatus of FIG. 1. The disclosed configurations are subtle because the required radius of curvature of the third mirror in the embodiment of FIG. 1 depends to some extent on the radius of curvature of the first and second mirrors. The optical assembly could be configured to ensure that parallel rays entering the apparatus are also parallel when they subsequently exit the assembly. From a design perspective, this can be achieved by tracing parallel light rays to make sure that the exiting light is collimated. In a real application, sunlight is not truly parallel, it is slightly divergent, and this divergence angle will typically be increased by the concentration ratio in that plane.

The algorithm described above concerns concentration of light in the plane perpendicular to the building façade. In this embodiment, the "slab" of light available for concentration direction approximately 1.5 feet wide, so the required concentration angle in this case is approximately $\tan^{-1}(0.75/3)$ to $\tan^{-1}(0.75/4)$. This is a small angle and it is readily achievable using an inexpensive Fresnel lens. In comparison to the concentration in the plane parallel to the building, the light must be concentrated in ⅓ of the path length, but the width of the available sunlight slab is only ⅓ of the width in the parallel plane, so the required concentration angle is approximately the same.

To summarize, in the perpendicular plane of this embodiment, the light can be concentrated in a single pass whereas the entire multipath could be used for concentration of the light in the parallel plane. A desirable feature of the configuration in FIG. 1 is the fact the three cylindrical mirrors are passive for light traveling in the parallel plane so the concentration of light in the two planes could be completely independent. This feature makes it possible for the apparatus to modify the spatial distribution of the redirected light differently depending on the dimensions of the spatial distribution.

To describe in further detail, although the light rays interact with all four elements (one lens and three mirrors) in the embodiment of FIG. 1, there are only two active elements in the parallel plane: (1) the lens concentrates the light in this plane, and (2) the third mirror 140 has to be optically active to re-collimate the convergent light. First mirror 120 and second mirror 130 are passive in this plane.

In order to be optically active in both planes, an optical element (e.g., lens, mirror, etc.) could be made of two separate lenses, or could be a single lens designed to have different concentration factors in the two planes. Additionally or alternatively, the lens could be replaced by a collecting mirror as described further below. Similarly, the desired characteristics of the third mirror could be achieved using a Fresnel lens element positioned either in front or behind the re-collimating mirror, or a single customized mirror.

A further significant advantage of some apparatuses of the inventive subject matter is that one or more of the optical elements (e.g., the light collection element, optical elements of optical assembly, etc.) could have a focal length in one direction that is larger (e.g., at least two times, at least three times, at least four times or even larger, etc.) than the focal length in the other direction. As a result, in some embodiments the light rays never converge to a single focus, and instead converge to a long focal line for one plane, and to a similar focal line in a perpendicular direction for the other plane. Furthermore, the rays could focus to a large oval region between the two. This is important from a safety perspective since it means that the lens in some embodiments (e.g., where a focal length in one direction is three times larger than the focal length in a different direction, etc.) is incapable of generating a high intensity focal point unintentionally resulting from light rays that strike the lens at an incorrect angle. This means the optical configuration could have the unique and important feature that there is no possibility that a fire could results from intense irradiation of a flammable surface.

Figure 3:
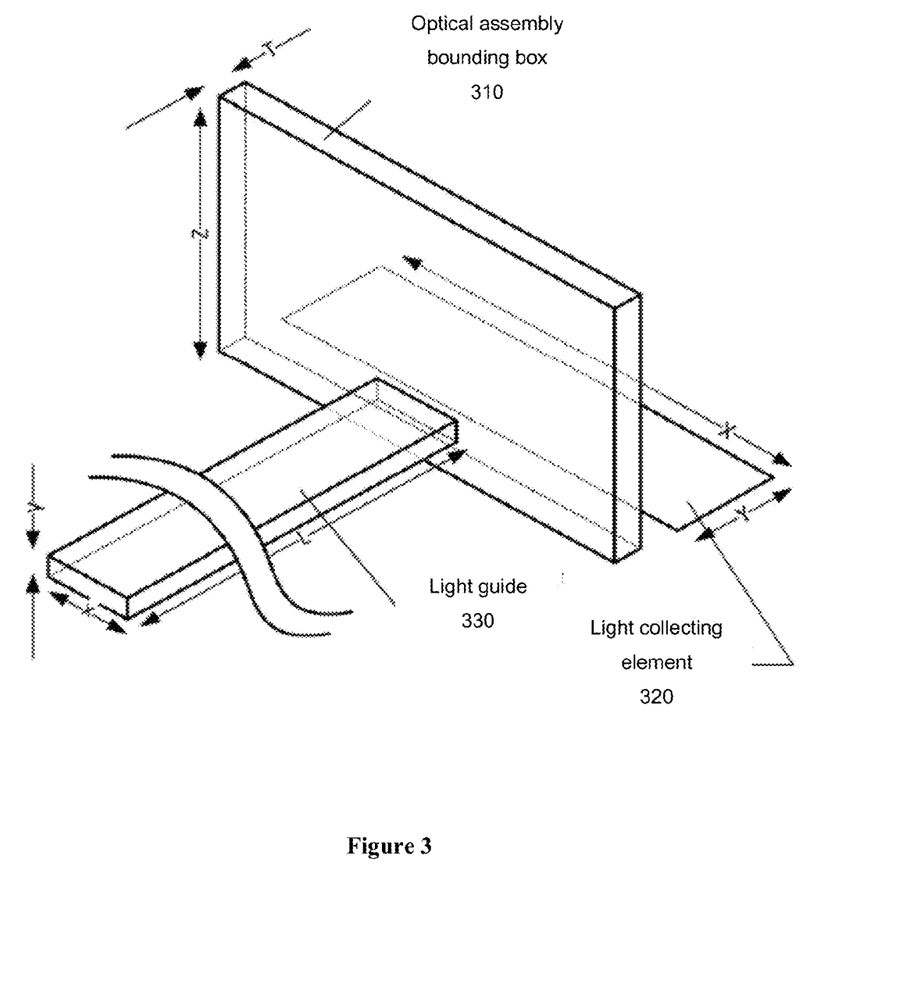
FIG. 3 illustrates an embodiment of a light concentrating apparatus of the inventive subject matter.

FIG. 3 illustrates another possible embodiment of an apparatus of the inventive subject matter where the light collecting element 320 is placed below a non-imaging optical assembly (within optical assembly bounding box 310). Furthermore, FIG. 3 provides a reference coordinate system for the following discussion. As illustrated, the light collecting element 320 could comprise a reflector (e.g., a mirror) rather than a lens. The light collecting element 320 could have dimensions X and Y and be configured to receive incident sunlight or other multi-spectral light. The incident sunlight could advantageously be reflected into a non-imaging optical assembly comprising a plurality of shaped reflectors that falls within a bounding box having dimensions Z and T. The dimension associated with Z could be at least one of (1) parallel to a building façade, and (2) substantially orthogonal to the output beam. Additionally or alternatively, the dimension associated with Z could be considered moderately or substantially parallel to a long dimension of the relay of reflections (e.g., vertical).

One should appreciate that an optical assembly bounding box could comprise a wall envelope, a double pane window, a trailer, joists, or any other suitable elongated structure. The dimension associated with T could be substantially orthogonal or orthogonal to a building façade or dimension Z, and substantially parallel or parallel to the output beam. Redirected light passing through a relay of reflections of shaped reflectors (e.g., mirrors, semi-transparent mirrors, etc.) in the non-imaging optical assembly could become more concentrated or collimated, and could form an unfocused output beam. The output beam could exit the non-imaging optical assembly via the light guide 330. Note that the cross section of the light guide has dimensions x and y. In view that the non-imaging optical assembly could modify the spatial distribution of the redirected light, one should appreciate that the ratio of x:X is not necessarily equal to the ratio y:Y as the optical assembly concentrates the redirected light associated with a first dimension (e.g., X) differently than in a second dimension (e.g., Y). As used herein, the term "vertical" is used euphemistically with respect to the orientation of FIG. 3. It should be understood that the inventive subject matter can be equally applied to the "horizontal" direction or any other suitable direction as well.

Some preferred non-imaging optical assemblies could comprise an aspect ratio (T/Z) defined by the parallel (or substantially parallel) extent (T) (relative to the output beam) divided by the orthogonal (or substantially orthogonal) extent (Z) (relative to the output beam) that is no greater than about 0.56, more preferably no greater than about 0.5, even more preferably no greater than about 0.46, and most preferably no greater than about 0.36.

Viewed from another perspective, the redirected light in some embodiments could fall within about ±20 degrees about the direction of propagation of the relay of reflections. Further, the parallel extent, T, is preferably no greater than 40 percent, more preferably no greater than 30 percent, and most preferably no greater than 20 percent of the orthogonal extent, Z.

In some embodiments, the output beam comprises a cross-sectional area (e.g., x*y) that is no greater than 10 percent, more preferably no greater than 20 percent, and most preferably no greater than 25 percent of the cross sectional area (e.g., X*Y, etc.) of the initial redirected light from the light collecting element. In view that spatial distribution in the "X" dimension is typically modified differently from the spatial distribution in the "Y" dimension, one should appreciate that the ratio of x:X is not typically equal to y:Y. Thus, the output beam could form a collimated oval rather than a collimated circular beam. Furthermore, the output etendue in some preferred embodiments is no greater than twenty times, more preferably no greater than fifteen times, and most preferably no greater than ten times the etendue of the initially reflected light (e.g., by a first mirror, etc.).

The advantageous spatial configuration of the non-imaging apparatus allows for disposing the non-imaging optical assembly in tight spaces. Viewed from another perspective, the assembly can be positioned, among other places, within a non-obtrusive housing, a window frame or even within an interior cavity of a building wall (e.g., a building envelope, etc.). For example, in some embodiments the optical elements of an optical assembly could advantageously fit within an enclosure that has a depth of 4-8 inches (e.g., 6 inches), and a height of 36-48 inches, such that the elements could be contained within a building envelope structure above a window on a floor of a building. An astute reader should appreciate that two or more (e.g., 3, 4, 5, 6, 7, 8, etc.) optical assemblies could be included in a building using minimal structure in addition to a building envelope, if any. Viewed from another perspective, all of the optical elements of an optical assembly could fit within an enclosure that has minimal depth such that one or more optical assemblies can be contained within the building envelope structure above windows on each floor of a building.

Figure 4:
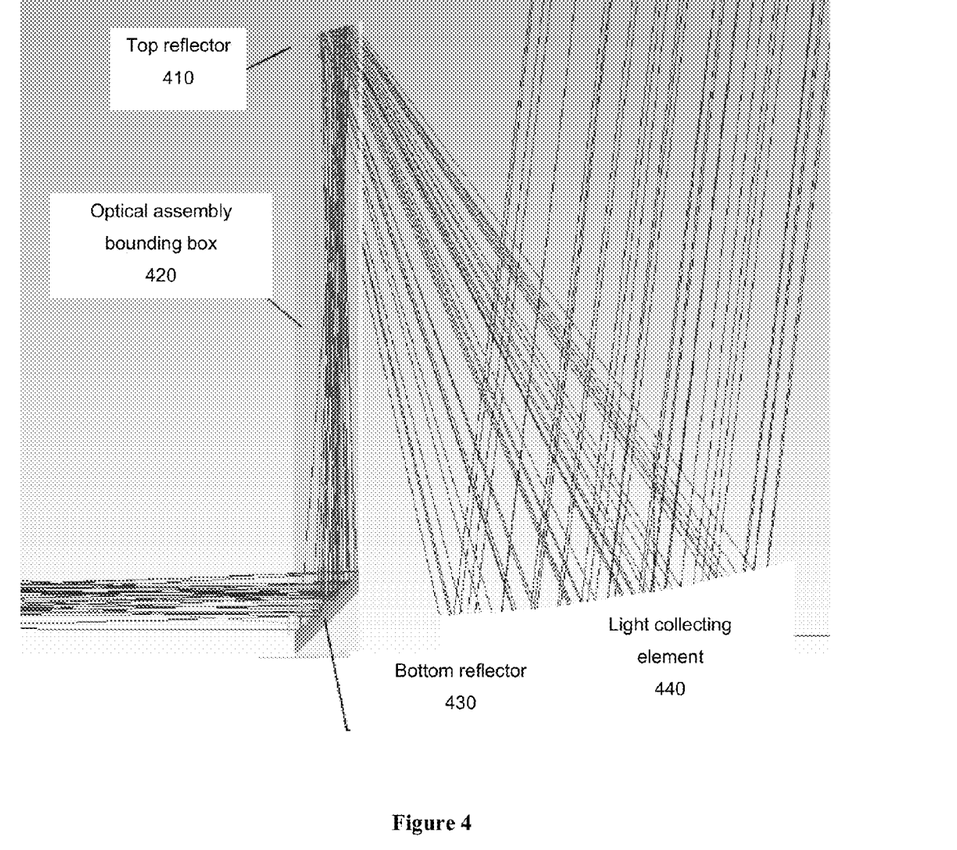
FIG. 4 is a side view graphical representation of light rays traveling though an apparatus of the inventive subject matter.

FIG. 4 presents a side view graphical representation of a light concentration apparatus of the inventive subject matter. The light concentration apparatus illustrated is configured according to the description of FIG. 3, and includes a light collecting element 440 in the form of a curved shaped reflector that receives substantially parallel incident light (e.g., sunlight). The light collecting element then redirects the light to a top shaped reflector 410 that further concentrates the redirected light. Finally, the redirected light is incident on a bottom shaped reflector 430 and is reflected to form a substantially collimated output beam. One should note the non-imaging optical assembly formed by the top and bottom reflectors fall within the aspect ratio of the outlined bounding box 420, which could be, among other things, a window frame.

Figure 5A:
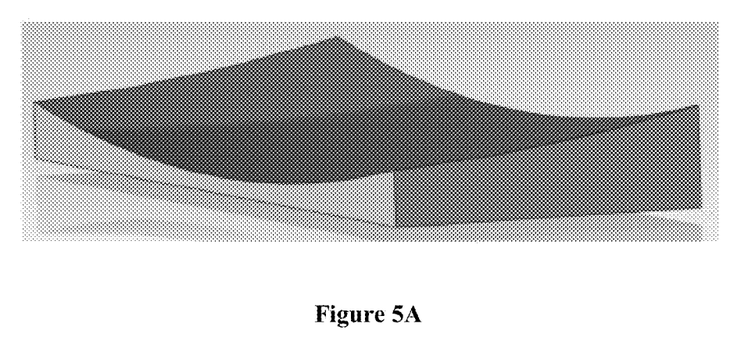
FIGS. 5A-C show possible mirrors of the inventive subject matter.
Figure 5B:
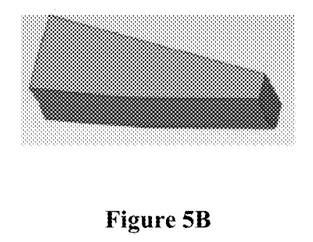
Figure 5C:
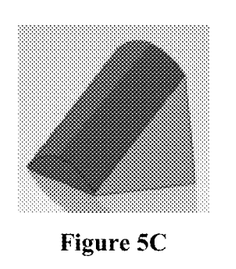
Figure 6:
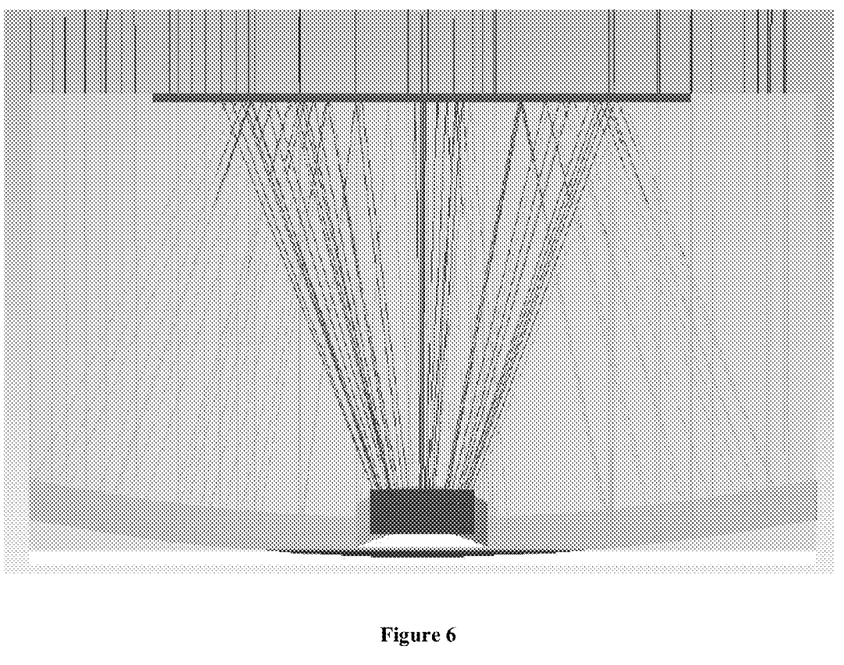
FIG. 6 is a rear view graphical representation of light rays traveling though an apparatus of the inventive subject matter.
Figure 7:
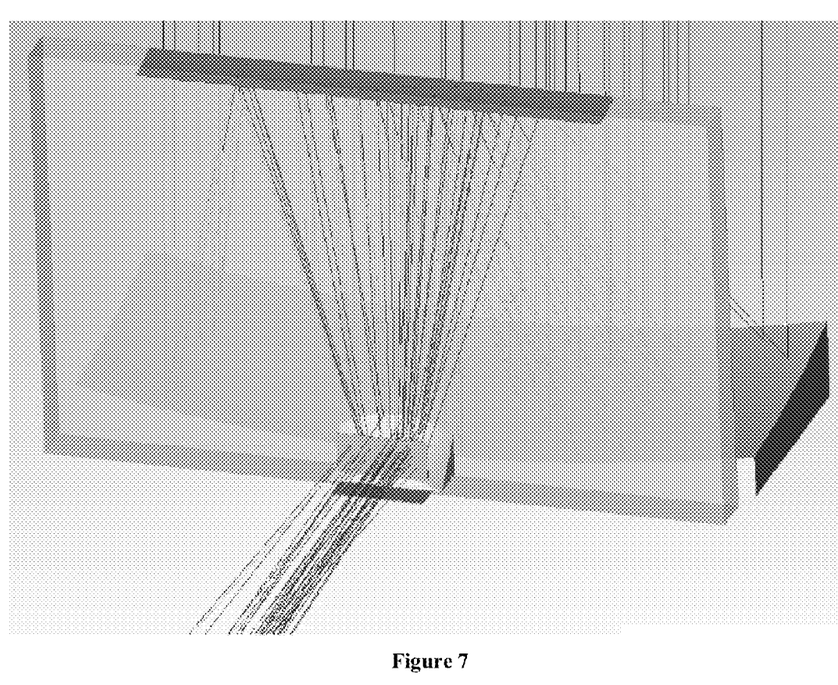
FIG. 7 is another graphical representation of light rays traveling though an apparatus of the inventive subject matter.

FIGS. 5A-C are example illustrations of possible optical elements (e.g., reflectors, etc.) that could be used in an apparatus of the inventive subject matter. It should be noted that the light collecting element could have two curvatures. A first curvature could be associated with the X direction (see FIG. 3) and a second curvature could be associated with the Y direction. Thus, one can consider the light collecting element as comprising two optical powers associated with the two dimensions. Similarly the top and bottom reflectors could also comprise shaped reflectors. The resulting non-imaging optical assembly could comprise two optical powers with respect to the dimensions of the spatial distribution of the redirected light. The difference in spatial distributions can be seen in FIG. 4 and FIG. 6. The side view of FIG. 4 corresponds to the Y dimension in FIG. 3. Further, FIG. 6 presents a back view of an apparatus clearly showing the spatial distribution in the X dimension. FIG. 7 presents an isometric view of the apparatus of FIG. 4 and illustrating how the spatial distribution associated with the X and Y dimensions are modified differently.

Some aspects of the inventive subject matter relate to the specific design of the shaped reflectors in the vertical (or substantially vertical) folded path concentrator system, and the optimization of the design using a small number of free parameters. The reflectors can be described in terms of a Cartesian coordinate system where the z axis describes the vertical direction, the x axis describes the horizontal axis parallel (or substantially parallel) to the façade of the building, and the y axis describes the horizontal axis perpendicular to the façade of the building.

Figure 8:
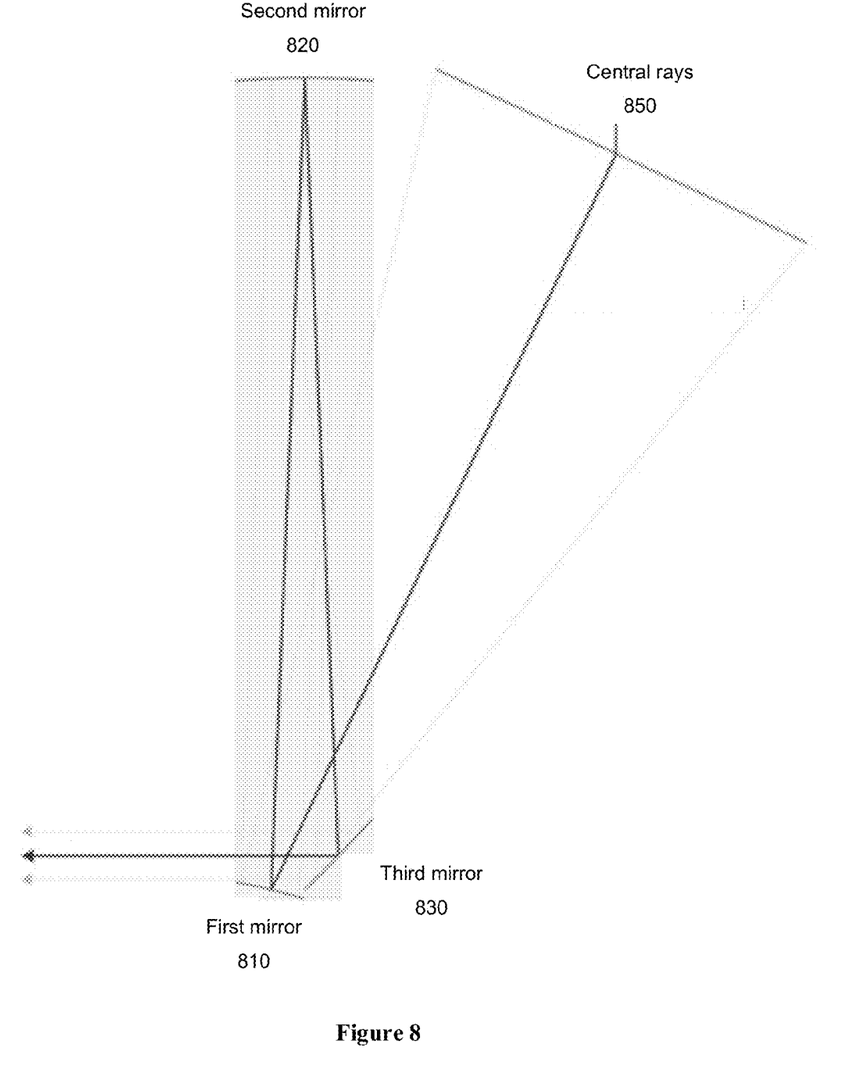
FIG. 8 illustrates aspects of a light concentrating apparatus of the inventive subject matter.

A basic description of a curve for each of first mirror 810, second mirror 820 and third mirror 830 shown in FIG. 8 is a plane that is perpendicular to a façade of a building, and sloping in a cross-sectional plane. The equation of this plane has the form z=A+Bx where A and B are constants, different for each mirror, and selected such that sunlight traveling along the optical path is appropriately directed into the light guide. This could redirect the light rays without causing any concentration, and most rays (except central rays 850) may not have the desired location and angle upon reflection from third mirror 830.

Concentration requires curvature in both the x and y directions, and so the equations describing the mirrors can be described with an additional quadratic term in both $x^2$ and $y^2$. In order to determine the coefficients of the curvature terms, it is possible to consider both the x and y directions somewhat independently. Considering the concentration in the y direction, perpendicular to the building façade, the light concentrated by first mirror 810 is preferably such that all of the light strikes second mirror 820, and an appropriate degree of either convergence or divergence in second mirror 820 could ensure that all of the light strikes third mirror 830. Third mirror 830 could then have a curvature to ensure that the light is recollimated to a desired or required degree when it enters a light guide aperture. The curvature in the y direction of the three mirrors (810, 820, 830) is in some embodiments simultaneously, rather than sequentially, optimized in order to determine the appropriate curvatures.

It is contemplated that sunlight or other light could be harvested from a wider region in an x direction than a y direction. For example, sunlight could be harvested from a 5 feet region in an x direction, and a 1.5 feet region in a y direction. As other examples, sunlight could be harvested from an x direction and a y direction at a ratio of approximately 10:1, 8:1, 5:1, 3.3:1, 2:1, 1:1, 1:2, 1:3.3; 1:5, 1:8, 1:10, respectively, or any other suitable ratio. Additionally, sunlight could be harvested from a 0.5 foot, 1 foot, 2 feet, 3 feet, 5 feet, 10 feet, 15 feet, 20 feet, 25 feet region, or any other suitable region in an x or y direction. In the embodiment illustrated in FIG. 8, sunlight could be harvested from a 5 feet (or approximately 5 feet) region in the x direction, and a 1.5 feet (or approximately 1.5 feet) region in the y direction. Additionally or alternatively, for the x direction, the concentration from first mirror 810 causes light to focus on a narrower spot, and the appropriate level of concentration or divergence in second mirror 820 ensures that all of the light strikes third mirror 830. Similarly, the appropriate curvature of third mirror ensures that the light could enter a light guide with a desired angular divergence in the x direction.

This relatively simple equation for each of the mirrors could be sufficient if it were not for off-axis optical effects, most notably the spherical aberration that results when a focusing element is large relative to the focal length. In some embodiments, the spherical aberration of some or all of the mirrors is significant. Thus, higher order corrections may be required. For example, sufficient aberration correction can be obtained by employing only additionally the higher order cubic terms $x^3$, $xy^2$, $x^2y$ and $y^3$. Where a system is bilaterally symmetrical in the x direction, the $x^3$ and $xy^2$ terms would have zero coefficients, so only the $y^3$ and $x^2y$ corrective terms would be required. This represents a considerable simplification of the equations for the possible curvature of the three mirrors (810, 820, 830) and makes it possible to optimize the curves using standard optimization algorithms and a small number of free parameters.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A light concentrating apparatus, comprising:
a light collecting element configured to receive incident light and redirect the incident light as redirected light;
a non-imaging optical assembly comprising a plurality of shaped reflectors and configured to receive the redirected light and serially modify directional and spatial distributions of the redirected light through a relay of reflections to form an output beam;
wherein the light concentrating apparatus is further configured such that a spatial distribution of the redirected light associated with a first dimension is modified differently than a spatial distribution associated with a second dimension; and
wherein at least two of the plurality of shaped reflectors comprises surfaces that are defined substantially according to the formula:

$$z = A + Bx + Cx^2 + Dy^2 + Exy^2 + Fx^3$$

wherein coefficients A, B, C, D, E and F are different for each of the at least two shaped reflectors, where x represents a position measured substantially horizontally perpendicular to the building façade, z represents a position measured in a vertical direction, and coefficients A, B, C, D, E, and F are obtained by a deterministic numerical optimization technique to maximize a transmission of visible light into at least one of a predetermined spatial aperture and a predetermined angular range.

2. The apparatus of claim 1, wherein the relay of reflections forms a loop.

3. The apparatus of claim 1, wherein the housing comprises an interior cavity of a window frame.

4. The apparatus of claim 1, wherein the output beam comprises an output aspect ratio that is different from an input aspect ratio of the incident light.

5. The apparatus of claim 1, wherein the light collecting element is configured to receive incident sunlight as the incident light.

6. The apparatus of claim 1, wherein the output beam comprises a substantially collimated beam.

7. The apparatus of claim 1, wherein the light collecting element comprises at least two optical powers associated with at least the first dimension and the second, different dimension.

8. The apparatus of claim 1, wherein the plurality of reflectors comprises mirrors.

9. The apparatus of claim 1, wherein the light collecting element comprises an incident light reflector.

10. The apparatus of claim 9, wherein the incident light reflector comprises a non-planar mirror.

11. The apparatus of claim 1, wherein the light collecting element comprises a lens.

12. The apparatus of claim 1, further comprising a light guide optically coupled with the non-imaging optical assembly and configured to receive the output beam.

13. The apparatus of claim 1, further comprising a housing configured to contain the non-imaging optical assembly, wherein the housing comprises an interior cavity of a building wall.

* * * * *